United States Patent [19]

Prey

[11] 4,074,229

[45] Feb. 14, 1978

[54] METHOD FOR MONITORING THE SEQUENTIAL ORDER OF SUCCESSIVE CODE SIGNAL GROUPS

[75] Inventor: Gerhard Prey, Munich, Germany

[73] Assignee: Siemens Aktiengesellschaft, Munich, Germany

[21] Appl. No.: 680,494

[22] Filed: Apr. 26, 1976

[30] Foreign Application Priority Data

Apr. 25, 1975 Germany .............................. 2518588

[51] Int. Cl.² ........................ G06F 11/10; G11C 29/00
[52] U.S. Cl. ............................ 340/146.1 AG; 235/312
[58] Field of Search ............ 340/146.1 AG, 146.1 AL, 340/146.1 AB, 146.1 A; 235/153 AM

[56] References Cited

U.S. PATENT DOCUMENTS

| 3,418,630 | 12/1968 | Van Duuren | 340/146.1 AL |
|---|---|---|---|
| 3,585,378 | 6/1971 | Bouricius et al. | 235/153 AM |
| 3,751,646 | 8/1973 | Geng et al. | 340/146.1 AG |
| 3,806,716 | 4/1974 | Lahti et al. | 340/146.1 AG |
| 3,921,132 | 11/1975 | Baldwin | 340/146.1 AG |
| 3,963,908 | 6/1976 | Das | 235/153 AM |

Primary Examiner—Charles E. Atkinson
Attorney, Agent, or Firm—Schuyler, Birch, Swindler, McKie & Beckett

[57] ABSTRACT

A method for monitoring the sequential order between successive code signal groups in program controlled data processing systems is described. Each code signal group is supplied with an additional check character, e.g., a parity bit, derived from the succeeding code group. Consistency is tested by comparing the check character carried in a given code group and that derived from the following code group.

4 Claims, 1 Drawing Figure

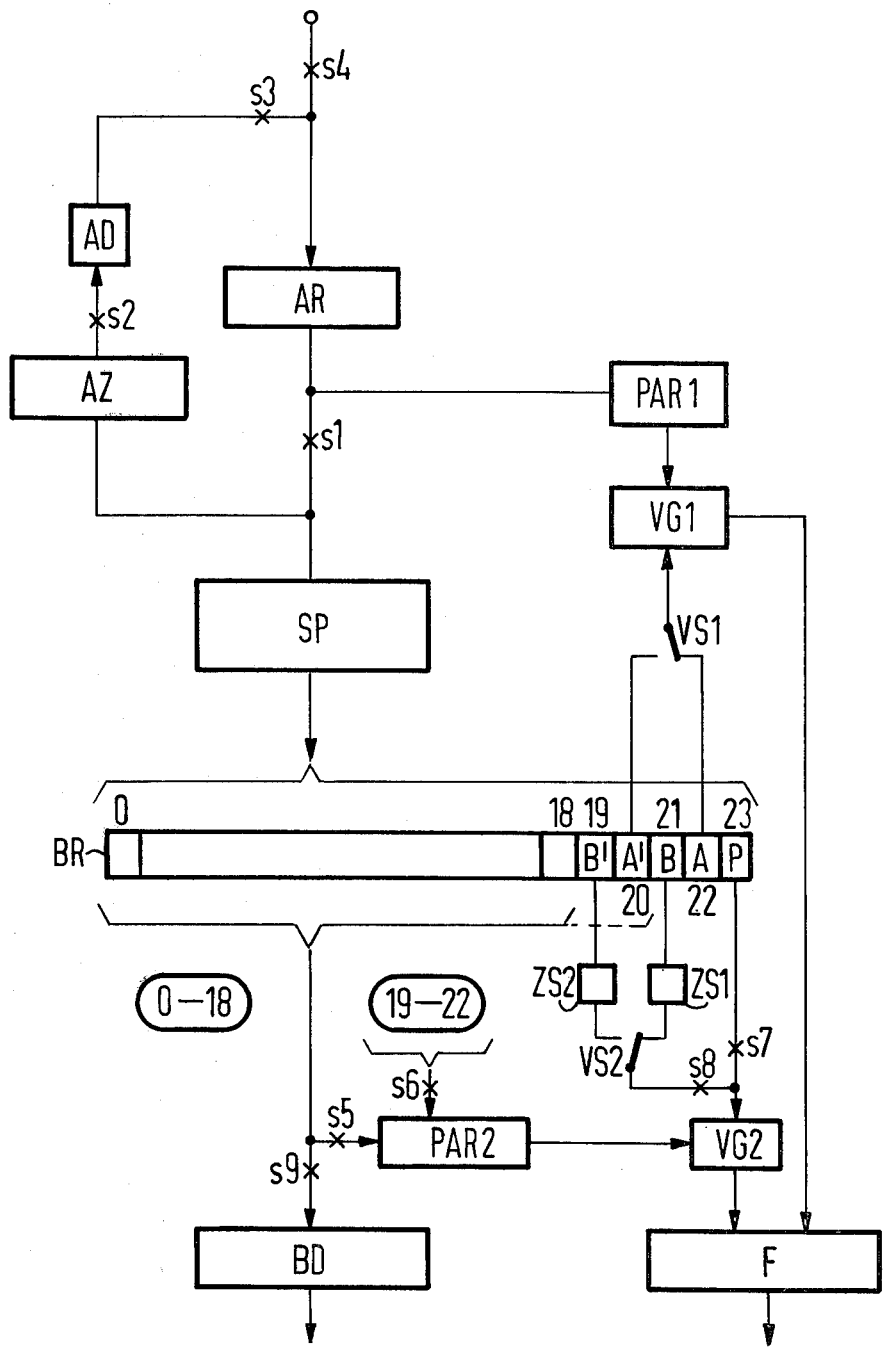

METHOD FOR MONITORING THE SEQUENTIAL ORDER OF SUCCESSIVE CODE SIGNAL GROUPS

BACKGROUND OF THE INVENTION

This invention relates to a method for monitoring the accurate and proper sequential order of successive code signal groups, e.g., binary numbers having a prespecified length such as address and/or instruction words in program-controlled information processing equipments.

Generally, code signal groups are employed to represent intelligence signals or information words. In many cases, in order to be able to verify the validity of code signal groups check characters (e.g., parity bits) in the form of binary numbers are added to each code signal group.

Frequently, the correct sequence of such code signal groups is also of prime importance. For this reason, it is a known practice for purposes of communication to combine code signal groups into blocks and to assign thereto within the block ordinal numbers indicating the sequence. However, this technique is only appropriate if the number of code signal groups within a block is comparatively small. If a multiplicity of code signal groups are present in a sequence, this technique involves greater system complexity.

An arrangement is known from U.S. Pat. No. 3,192,362 wherein the proper sequential operation of an instruction address counter in a program-controlled data processing unit is so monitored that the parity of the address waiting for service and the stored parity of the preceding address are compared with each other, and the values of corresponding bits in both addresses are fixed and checked in accordance with a predetermined logic. The validity of the address sequence is then deduced from these checks. In most caes, such a method is much too complicated.

An improved method is described in British Pat. No. 1,038,704, wherein each code signal group has two additional parity bits, one of which is derived from the address of the subsequent code signal group and the other from the address associated with the code signal group in question. During the readout of a code signal group the check character derived from the subsequent code signal group is buffered until the readout of the subsequent code signal group, and it is then compared with the other check character. If the two check characters being compared do not agree, an error signal is generated.

Accordingly, it is an object of this invention to provide a method that enables in a simple way and with little further expenditure and system complexity the monitoring of the code signal groups for insuring the accurate and proper sequential order of retrieval of information in a stored program machine or the like.

SUMMARY OF THE INVENTION

The foregoing and other objects of the invention are achieved in that both check characters associated with a given code group are derived from the subsequent code signal group. One check character serves for the monitoring of the address sequence and the other for the monitoring of the sequence of instructions. The corresponding comparison check characters are derived directly from the available indications to or from the subsequent code signal group using separate checking apparatus.

Due to the direct derivation of the comparison check character from the available indications to or from the subsequent code signal group, this comparison check character need not be transmitted separately in each code signal group. The space released in each code signal group is thus utilized for a further check character for directly checking the sequence of instructions. A simple distinction can thus be made between whether a possible error in the instruction sequence is due to an error in the address sequence or to an error in the remaining controls.

According to a further advantageous development of the invention, during adjustment of the address register while an instruction is still being executed, the address sequence is checked using the check character derived directly from the subsequent address stored in the address register and using the check character stored in the instruction register. In this case temporary storage of the check character for monitoring the address sequence is not necessary. In each and every case the check characters can be generated in the same way as is the check character for guarding the code signal group against transmission errors, so that one and the same device can be utilized for locating the individual check characters for the different tests.

Often a sequence of code signal groups includes branches wherein the branch to be selected is dependent on the compliance or noncompliance with certain conditions. In order to implement the method in accordance with the invention, each code signal group has a separate check character for each branch, and from these check characters a corresponding check is selected.

It is especially advantageous if the device monitoring the branch conditions is provided in duplicate in the known manner, and it is desirable that both of these devices operate in parallel with only one acting upon a given job sequence of the code signal groups and the other only controlling the selection of the corresponding check characters. In this way, as well, the proper operation of the sequential control and of the devices performing the conditional check can readily be monitored via the sequence check without requiring additional circuitry or additional cost.

BRIEF DESCRIPTION OF THE DRAWING

Further details of the invention will now be described with reference to a preferred and illustrative form of apparatus for applying the method of the invention to a part of the program flow control of a control unit.

DETAILED DESCRIPTION OF THE DRAWING

An instruction storage SP is provided, which may be activated by means of an address register AR for indicating the next instruction of the running program. Apart from jump instructions or other address modifications, the address sequences are obtained by a continuous incrementing by 1. For this purpose, the addresses waiting for service in address register AR are accepted by address buffer storage AZ and fed back in modified form to address register AR by means of adder AD. The selected instructions in storage SP are accepted by instruction register BR and fed from there to instruction decoder BD, which produces the necessary switching instructions for the branching.

Parity checkers PAR1 and PAR2 are provided in a manner known from prior art to check the addresses and instructions. Each instruction word in instruction register BR comprises, for example, the bits 0 to 23, of which bit 23 includes in customary manner the parity bit P, which is compared over comparator VG2 with the parity bit formed from the other bits 0 to 22. If there is no agreement, the monitoring device F triggers an error alarm.

In accordance with the invention each instruction word has an additional checking mark, viz. A/B and A'B'. Marks A and A' include parity bits for the address of the following instructions, mark A' being evaluated only if there is a branch. The same is true of marks B and B', the only difference being that in this case the instruction words themselves are subjected to the check. Accordingly, buffer storages ZS1 and ZS2 are provided so as to prevent the check bits from getting lost when a switch is made to the next instruction word. Temporary storge of the check bits for the addresses is not necessary if, as assumed, the address for the next instruction is provided as the instruction waiting for service, is still being executed. The switching instruction for branching to check marks B' and A' is effected by switches VS2 and VS1 which are controlled in a manner in itself known from the conditional check recognizing a branching.

Switches s1 to s9 control in a manner found in the prior art the functional sequence of the device shown, wherein switches are activated one after another with displacement in time in a specified cycle. Such operations of the switches spaced by a time interval enable, for example, the parity checkers (e.g. PAR2) to be fully utilized both within the scope of the transfer check and for the sequence check. If, for example, switches s5, s6 and s7 are operated simultaneously, the transfer check is performed in a first step, that is, the parity bit P is compared with the parity bit ascertained from the other bits 0 to 22. In a subsequent timing pulse the switches s5 and s8 are actuated, thereby initiating the sequence check of the instruction words. The same is true for the addresses at the output of address register AR.

As apparent from the drawing, the switches s3 or s4, as well as VS1 and VS2, must be influenced at like rates, since the check characters can only produce a correct result if an address is fed to address register AR via switch s4. Hence, if the check mark P of the instruction word read from the storage is correct and an error nevertheless appears during the further check, it may in all probability be assumed that an error must be found in the sequence and conditional control (not shown) governing the above mentioned switches s . . . and VS . . .

If there is an error, the instruction signalled as defective or the address may be repeated in a simple way. Since the check marks run ahead, there is the simple possibility of preventing false or faulty instructions from being executed at all.

A preferred form of apparatus for executing the method of the invention is described above. The described apparatus and the operations specific to it are considered to be only exemplary, and they can be modified or changed in a number of ways known to those skilled in the art while remaining within the scope of the invention as defined by the appended claims.

I claim:

1. A method for monitoring for insuring the accurate and proper sequential order of successive code signal groups used in program controlled data processing apparatus, wherein each said code signal group includes at least two check characters, at least one of which is derived from the subsequent code signal group and wherein the accurate and proper sequential order is monitored by comparing the said check character with a further check character derived from the next code signal group, comprising the steps of:
   deriving both said check characters from the successive code signal group,
   monitoring the address sequence under the control of a first of said check characters,
   monitoring the sequence of instructions using the second of said check characters and
   comparing check characters derived directly from available indications to or from the next code signal group in sequence using separate checking apparatus.

2. The method defined in claim 1 comprising the additional steps of:
   adjusting an address register in the program controlled data processing apparatus while an instruction is still being executed, said monitoring of said address sequence step being carried out during adjustment of said address register using a check character derived directly from the next address stored in the address register and using a check character stored in the instruction register.

3. The method defined in claim 1 wherein a sequence contains branching instructions and comprising the additional step of:
   providing separate check characters for each branch which can be taken from the branch instruction from which check characters the corresponding character is selected independently of the branch conditions to be met.

4. The method defined in claim 3 wherein apparatus is provided in duplicate for monitoring branching conditions, said apparatus operating in parallel, and comprising the additional step of:
   controlling the job sequence with one of the branch monitoring apparatus and selecting corresponding check characters using the second of the branch monitoring apparatus.

* * * * *